United States Patent [19]

Ivannikov et al.

[11] 4,307,281
[45] Dec. 22, 1981

[54] METHOD OF ARC WELDING

[76] Inventors: Alfred V. Ivannikov, 4 linia, 45, kv. 40; Vyacheslav N. Matveev, ulitsa Reshetnikova, 17, kv. 161, both of Leningrad, U.S.S.R.; Nikolai A. Eroshkin, deceased, Leningrad, U.S.S.R.; by Valeriya I. Eroshkina, administrator, Sirenevy bulvar, 7, korpus 1, kv. 286, Leningrad, U.S.S.R.; by Andrei N. Eroshkin, administrator, prospekt Energetikov, 54, korpus 1, kv. 49, Leningrad, U.S.S.R.; by Mariya I. Eroshkina, administrator, Leninsky prospekt, 158, kv. 11, Leningrad, U.S.S.R.

[21] Appl. No.: 72,681

[22] Filed: Sep. 5, 1979

[51] Int. Cl.³ .............................................. B23K 9/00
[52] U.S. Cl. ............................................. 219/137 R
[58] Field of Search ................................... 219/137 R

[56] References Cited

U.S. PATENT DOCUMENTS 4,100,389  7/1978  Tanaka et al. ............. 219/137 R X

FOREIGN PATENT DOCUMENTS 204088  10/1956  Australia .......................... 219/137 R
1814325  8/1970  Fed. Rep. of Germany .

OTHER PUBLICATIONS

Cary, Howard B.; *Modern Welding Technology*, Prentice-Hall, N.J., 1979, pp. 307–313.

Primary Examiner—Gene Z. Rubinson
Assistant Examiner—Keith E. George
Attorney, Agent, or Firm—Fleit & Jackson

[57] ABSTRACT

A method of consumable electrode arc welding with the end of the electrode submerged into the molten pool wherein the maximum cross sectional dimension of the electrode end to be submerged into the molten pool is chosen so that it does not exceed twice the minimum dimension of this cross-section. Said dimensions are made to fit the required width of the weld by adopting the minimum dimension of said cross-section of less than the width but no less than half the width, for the same weld width required. The arc length is set below said minimum dimension, and the consumable electrode is fed at a speed lower than the welding speed, choosing the ratio of the consumable electrode feed speed to the welding speed, for the same weld width required, so that the greater the cross-sectional area of said end of the consumable electrode, the smaller is the ratio.

1 Claim, 1 Drawing Figure

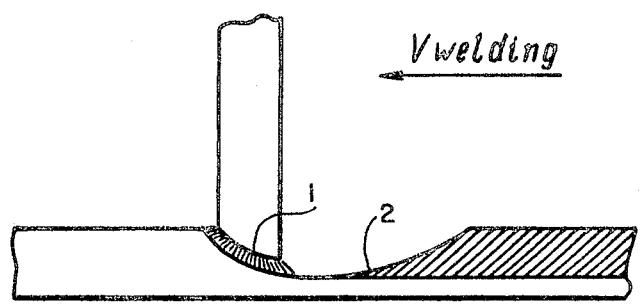

METHOD OF ARC WELDING

FIELD OF THE INVENTION

The present invention relates to arc welding and more particularly to methods of consumable electrode arc welding. The invention may be used, for example, for submerged arc welding, for gas and gas-mixture-shielded arc welding, and for arc welding without powder fluxes and shielding gases.

It is expedient to use the invention in those branches of industry where high-speed arc welding is needed, for instance, in the mechanical engineering industry, shipbuilding, motor-car industry, and particularly in tube manufacturing.

BACKGROUND OF THE INVENTION

The most necessary condition for a high quality welded joint is a well-formed weld without faults such as incomplete fusion, collars, and undercuts.

In conventional methods of arc welding with the speed of feeding the consumable electrode substantially (e.g. by a factor of 2 to 200) higher than the welding speed, these faults appear at a welding speed above 70 meters per hour (m.p.h.). At such a speed, the base metal has not enough time to get thoroughly warmed before the welding arc is applied, and incomplete fusion and undercuts are liable to occur. Besides, such methods fail to provide a uniformity of width and reinforcement of weld.

Nevertheless, modern production practice requires a speed of welding significantly higher than 70 m.p.h. (up to 150 m.p.h. or more). To eliminate said faults, multi-arc welding is employed and this involves the use of complicated equipment, bulky and inconvenient in operation.

There is known in the art a method of single-arc welding where the workpiece is fixed with a certain slope to the direction of welding so as to cause the liquid metal of the molten pool to flow in the welding direction under the effect of gravity, while the electrode is fixed with a backward slope of 10 to 15 deg. in relation to the direction of welding. This method of welding provides a better warming-up of the base metal before the welding arc is applied, thus making it possible to get a weld having satisfactory strength properties with high welding speeds (up to 300 m.p.h.).

The main shortcoming of the above method is its impracticability for workpieces which cannot be fixed with a required slope because of their construction, overall dimensions or production conditions which narrows the field of application of this method. Besides, although the weld obtained by said method exhibits satisfactory strength properties, it still has undercuts, incomplete fusion, collars, and lacks uniformity of width and reinforcement.

Known in the art is a method of single-arc welding with automatic feed of the consumable electrode of a round cross-section, wherein the above drawbacks are overcome (FRG Patent No. 1814325). According to this method, welding is carried out by an electrode with its end submerged in a molten pool using a wire electrode, flux and a heavy current (1000 to 4000A). In accordance with this method, the diameter of the wire electrode is chosen according to the welding current: with the current of 1500 to 2500A, it equals 6 to 8 mm, with the current above 2500A, it is at least 7 mm.

This method aims to obtain a high quality weld for high-speed arc welding (up to 300 m.p.h.).

The shortcoming of this method is that its application is limited to submerged arc welding at heavy currents. Moreover, the limited lowest diameter of the electrode makes it impossible to obtain sufficiently small welds, the minimum weld width being limited to no less than 7 mm.

SUMMARY OF THE INVENTION

It is an object of the present invention to extend the field of application of the method and to provide welds of any predetermined dimensions while operating at high speeds of single-arc welding and maintaining a high quality of the weld being formed.

With this and other objects in view, there is provided a method of consumable electrode arc welding with the end of the electrode submerged into the molten pool wherein, according to the invention, the maximum dimension of the cross-section of the electrode end to be submerged into the molten pool does not exceed twice the minimum dimension of this cross-section, said dimensions being made to fit the required weld width by adopting the criterion whereby the minimum dimension of this cross-section will be less than the width but no less than half the width for the same weld width required, the length of the arc being set below said minimum dimension of the cross-section. Then the consumable electrode is fed at a speed lower than the welding speed, choosing the ratio of the consumable electrode feed speed to the welding speed, for the same weld width required, so that the greater the cross-sectional area of said end of the consumable electrode, the smaller is the latter ratio.

The method of welding with the electrode end submerged into the molten pool provides an increased concentration of the arc heat penetrating the molten pool.

Owing to said relationships between the cross-sectional dimensions of the electrode and the width of the weld, between the electrode feed speed and the welding speed, and between the arc length and the cross-sectional dimensions of the consumable electrode, the end of the consumable electrode submerged in the molten pool is melted with a bevel facing the direction of welding, which provides a sufficient preheating of the base metal before application of the molten pool even at high-speed welding.

Besides, with said relationship between the feed speed of the electrode and the speed of welding, the turbulence of the molten pool caused by the welding arc is reduced.

The increased arc heat penetration into the molten pool, the preheating of the base metal before application of the molten pool, and a sufficiently small turbulence of the molten pool caused by the welding arc all provide a well-formed weld.

As the minimum dimension of the cross-section of the electrode end to be submerged into the molten pool should be no less than half the required weld width, it is always possible to select an electrode of such a minimum dimension, and hence to obtain a weld of any predetermined dimensions.

It is clear from the above that the main advantages of said method do not depend on the type of shielding under which the weld is being formed or on the shape of the electrode cross-section; therefore, this method is suitable for submerged arc welding, for gas- and gasmixture-shielded arc welding with both round and other-than-round shapes of electrode cross-section, and for welding without the use of powder fluxes and shielding gases.

BRIEF DESCRIPTION OF DRAWING

The present invention is illustrated by a detailed description of the examples of its embodiment given below, and will now be described with reference to the following FIGURE:

FIG. 1 is a side view of an arc welding arrangement for implementing the inventive method.

DETAILED DESCRIPTION OF THE INVENTION

In accordance with the invention, referring to the FIGURE, the minimum dimension of the cross-section of the electrode end 1 to be submerged into the molten pool is chosen to be smaller than the required weld width but no less than half the width, depending on the weld width required, while the maximum dimension of this cross-section should not exceed twice its minimum dimension.

In case of using a round-section electrode, as will be clear to those skilled in the art, the minimum and maximum dimensions of said cross-section of the electrode are identical and represent the diameters of the electrode; therefore, in this case, it is the diameter of the consumable electrode that is chosen smaller than the weld width but no less than half the width. In case a rectangular electrode is used, the minimum dimension will be the length of the smaller side, while the maximum dimension will be the diagonal length of the rectangle.

As should be clear to those skilled in the art, the round electrode shape is most favourable, but in specific cases it is preferable to employ a rectangular electrode; e.g., the electrode of this particular cross-section with an area equal to that of the round electrode enables the welding to be done in a wider range of sizes.

It will be also clear to those skilled in the art that, in case neither round nor rectangular electrodes are available, or if otherwise necessary, electrodes of other configurations may be used such as annular or regular polygon shapes, etc.

For the sake of convenience, all the discussion hereinbelow is given as applicable to round-shaped electrodes.

Choosing the diameter of the consumable electrode near the desired width of the weld, a smooth passage of the weld into the base metal can be obtained, due to the smaller amount of deposited metal (according to the law $I^2RT$, wherein I is the welding current, R is the electric resistance of the free end of the electrode, T is the time of passage of the current through the free end of the electrode).

Such diameters of the electrodes are of use when the welds are formed mainly by the molten electrode.

The chosen diameter of the electrode determines the magnitude of the welding current and hence the desired depth of fusion into the base metal, while the feed speed of the consumable electrode should be invariably lower than the required speed of welding, and is fixed at a level allowing the process to be carried out with the electrode end 1 submerged in the molten pool 2, the length of the arc being invariably smaller than the diameter of the electrode.

As stated earlier, as a result of the inventive method, the end of the consumable electrode submerged in the molten pool is melted with a bevel facing the direction of welding V (see the FIGURE), which provides a sufficient preheating of the base metal before application of the molten pool even at high-speed welding.

Now the voltage of the arc is fixed, and it should be apparent to those skilled in the art that the arc voltage, apart from the aforementioned parameters, depends also on specific materials of the electrode, the base metal, the nature of the arc environment, and the kind and polarity of the welding current. The sequence of said parameters (i.e., the sequence of operations needed to implement said method) is chosen at will. The following examples are designed for use with the reverse polarity direct current:

EXAMPLE 1

A tee joint is to be produced by submerged arc welding.

Base metal—carbon steel.
Electrode material—mild steel.
Required width of the weld (hypotenuse of the weld)—4 mm
Required speed of welding—175 m.p.h.

As the weld at the tee joint is formed mainly by the molten electrode material, the diameter of the electrode is chosen to be equal to half the required width of the weld, i.e., 2 mm. The diameter of the electrode chosen thereabove determines:

current—450 A.
electrode feed speed—160 m.p.h.
arc voltage—23 V.

As a result, a weld is obtained with a uniform width of 4 mm without undercuts and collars.

EXAMPLE 2

A butt joint 7 mm thick is to be produced by $CO_2$-welding without bevelling.

Base metal—low-alloy steel.
Electrode material—manganese-silicon steel
Required width of the weld—8 mm
Required speed of welding—180 m.p.h.

In this case the weld is formed by melting nearly equal quantities of the base metal and the electrode material. So the diameter of the consumable electrode is to be equal to 0.75 the width of the weld, i.e. 6 mm.

The diameter of the electrode chosen thereabove determines:

current—1000 A.
electrode feed speed—82 m.p.h.
arc voltage—24 V.

As a result, a weld is obtained without undercuts, and of a uniform width and reinforcement, and having the following dimensions:

width—8 mm
reinforcement—2.5 mm
depth of fusion—3.5 mm.

EXAMPLE 3

A butt joint 12 mm thick is to be produced by submerged arc welding without bevelling.

Base metal—low-alloy steel
Electrode material—mild steel
Required width of weld—16 mm
Required speed of welding—220 m.p.h.

The diameter of the electrode is to be equal to 0.75 the width of the weld, i.e. 12 mm.
The diameter of the electrode, chosen thereabove, determines:

current—3500 A.
electrode feed speed—90 m.p.h.
arc voltage—25 V

As a result, a weld is obtained without undercuts, and of a uniform width and reinforcement, and having dimensions given below:

width—16 mm
reinforcement—3.5 mm
depth of fusion—8.5 mm.

EXAMPLE 4

A butt joint of 12 mm of thickness is to be produced by $CO_2$-welding without bevelling Base metal—low-alloy steel
Electrode material—medium-manganese steel
Required width of the weld—10 mm
Required speed of welding—180 m.p.h.

The diameter of the electrode is to be equal to 0.9 the width of the weld, i.e. 9 mm.
The diameter of the electrode, chosen thereabove, determnies:

current—2500 A.
electrode feed speed—70 m.p.h.
arc voltage—23V.

As a result, a weld is obtained without undercuts, and of a uniform width and reinforcement, and having the following dimensions:

width—10 mm
reinforcement—3.5 mm
depth of fusion—6.5 mm.

As shown by the aforementioned examples, the proposed method provides welds of any predetermined dimensions obtained at a high speed of arc welding and with a high quality of the weld formed. The advantages of said method are independent of the type of arc shielding of the metal being melted.

The method is applicable for a wide range of welding speeds including the normal speed of welding (below 70 m.p.h.). It will be apparent to those skilled in the art that the weld formed at a speed of below 70 m.p.h., using this method, is not inferior to the weld formed at higher welding speeds.

Although the particular embodiments of the invention have been described hereinabove, it will be apparent that numerous modifications and other embodiments of the invention may be devised without departing from the scope thereof, as defined by the following claims.

What is claimed is:

1. A method for consumable electrode arc welding in accordance with a welding speed, said method comprising the steps of:
    providing a consumable electrode having a cross-section with minimum and maximum dimensions and a cross-sectional area, and a workpiece;
    striking an arc between said consumable electrode and said workpiece so as to form a molten metal pool which solidifies to form a weld;
    selecting said maximum dimension of the cross-section of said consumable electrode at the end thereof to be submerged into the molten pool so that said maximum dimension of the cross-section of said consumable electrode does not exceed twice the minimum dimension of said cross-section;
    further selecting said minimum and maximum dimensions to fit a required width of the weld by adopting said minimum dimension of said cross-section of said consumable electrode, for the same required weld width, to be less than said required weld width but no less than half the required weld width;
    setting a length of said arc below said minimum dimension of said cross-section;
    submerging said end of said consumable electrode into said molten pool;
    feeding said consumable electrode at a speed lower than the welding speed; and
    choosing a ratio of said speed of feeding said consumable electrode to said welding speed, for the same said required weld width, such that the greater said cross-sectional area is, the smaller is the ratio of said speed of feeding to said welding speed.

* * * * *